United States Patent
Bartik et al.

(10) Patent No.: US 7,881,906 B2
(45) Date of Patent: Feb. 1, 2011

(54) METHOD, SYSTEM AND COMPUTER PROGRAM PRODUCT FOR EVENT-BASED SAMPLING TO MONITOR COMPUTER SYSTEM PERFORMANCE

(75) Inventors: Jane H. Bartik, Poughkeepsie, NY (US); Willm Hinrichs, Holgerlingen (DE); Martin Recktenwald, Steinenbronn (DE); Patrick M. West, Jr., Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/031,735

(22) Filed: Feb. 15, 2008

(65) Prior Publication Data

US 2009/0210196 A1    Aug. 20, 2009

(51) Int. Cl.
  *G06F 11/30* (2006.01)
  *G06F 11/34* (2006.01)
(52) U.S. Cl. .................. 702/186; 702/182; 702/187; 714/47
(58) Field of Classification Search .......... 702/186, 702/182, 183, 187
See application file for complete search history.

(56) References Cited

U.S. PATENT DOCUMENTS

| | | | |
|---|---|---|---|
| 4,590,550 A | 5/1986 | Eilert et al. | |
| 4,821,178 A * | 4/1989 | Levin et al. | 714/47 |
| 5,151,981 A | 9/1992 | Westcott et al. | |
| 6,249,886 B1 | 6/2001 | Kalkunte | |
| 6,507,805 B1 | 1/2003 | Gordon et al. | |
| 6,665,823 B2 | 12/2003 | Lee | |
| 6,678,883 B1 | 1/2004 | Berry et al. | |
| 6,857,014 B1 | 2/2005 | Paterson et al. | |
| 7,047,521 B2 * | 5/2006 | Bunnell | 717/130 |
| 7,099,797 B1 | 8/2006 | Richard | |
| 7,233,843 B2 | 6/2007 | Budhraja et al. | |
| 7,278,048 B2 | 10/2007 | Clark et al. | |
| 7,278,063 B2 | 10/2007 | Billeci et al. | |
| 2002/0002442 A1 * | 1/2002 | Rivin et al. | 702/186 |
| 2005/0183065 A1 | 8/2005 | Wolczko et al. | |
| 2007/0043485 A1 | 2/2007 | Meissner | |

(Continued)

FOREIGN PATENT DOCUMENTS

JP    2001142747    5/2001

OTHER PUBLICATIONS z/Architecture, Principles of Operation, Sixth Edition, Apr. 2007, Publication No. SA22-7832-05, copyright IBM Corp. 1990-2007, pp. 1-1218.

(Continued)

*Primary Examiner*—Hal D Wachsman
(74) *Attorney, Agent, or Firm*—Cantor Colburn LLP; John Campbell

(57) ABSTRACT

A system, method and computer program product for event-based sampling to monitor computer system performance are provided. The system includes a sample buffer to store a sample of instrumentation data, where the instrumentation data enables measurement of computer system performance. The system also includes a sample segment selector to isolate a segment of the sample of instrumentation data as an event. The system further includes an instrumentation counter counting in response to a combination of the event and a sample pulse, and asserting a sample interrupt indicating that the sample of instrumentation data is ready to logout from the sample buffer.

20 Claims, 2 Drawing Sheets

U.S. PATENT DOCUMENTS

2007/0220495 A1    9/2007   Chen et al.

OTHER PUBLICATIONS

E. Barakat et al., Procedure for Developing Data for Maintenance Assurance Test and Basic Assurance Test for Use In RAS Analysis of Computer Systems, IBM Technical Disclosure Bulletin, 1986, 3 pages.

L.C. Heller, et al., Millicode in an IBM zSeries Processor, IBM J. Res. & Dev., vol. 48 No. 3/4, May/Jul. 2004, 10 pages.

U.S. Appl. No. 12/031,727, filed Feb. 5, 2008.

* cited by examiner

METHOD, SYSTEM AND COMPUTER PROGRAM PRODUCT FOR EVENT-BASED SAMPLING TO MONITOR COMPUTER SYSTEM PERFORMANCE

BACKGROUND OF THE INVENTION

This invention generally relates to computer system performance monitoring. More specifically, the invention relates to event-based sampling to monitor computer system performance.

Computer system performance measurement enables detection of issues that can result in reduced throughput of the computer system. One approach to measuring performance is to repeatedly execute workload instruction streams, which are often segments of customer workload code that stress particular hardware and/or software functions, and collect data relevant to the system's performance. Initially, hardware captures selected signals and stores them for further analysis. Each group of the selected signals is called a "sample" that is associated with executing an instruction. Each sample can contain various information about processor state for performance evaluation, such as process ID, virtual storage address, op-code and information about activity associated with the instruction (delays, caching, etc.). The captured data are later used for calculating performance analysis metrics such as cycles per instruction (CPI), cache misses/hits, pipeline stalls, and the like. Basic mechanisms for data capturing and performance measurement, also referred to as "instrumentation", are described in U.S. U.S. Pat. Nos. 4,590,550, and 4,821,178, each of which is hereby incorporated herein by reference in its entirety.

For instrumentation, it is desirable to start collecting data on a time increment and to capture a set of data on regular time intervals. During a typical instrumentation run, controls are set to collect data on a time interval. Each time the interval expires, the instrumentation signals are captured and saved. As an example, the sampling interval may be set to ensure that 5 million samples in the computer system image of interest are collected during a 6-10 minute measurement window.

A major drawback to this existing approach is that running instrumentation entails capturing large amounts of data, with only a limited amount of data being of interest to calculate performance metrics. Thus, current approaches to instrumentation may require post-processing tools to filter out data of interest from the large volume of data. As computer system processor speeds continue to increase in the multi-gigahertz range with heavily pipelined architectures, difficulties in correlating specific events to samples, as well as storing (logging out) the large volume of data, are also increasing. Pipelining can result in misalignment between control signals for sampling and event signals within the samples.

It would be beneficial to allow instrumentation data to be captured using a time based approach that also corresponds to an event. Additionally, it would be advantageous to reduce the volume of data collected by logging out a sample after a predetermined number of events are detected. Accordingly, there is a need in the art for event-based sampling to monitor computer system performance.

BRIEF SUMMARY OF THE INVENTION

An exemplary embodiment includes a system for event-based sampling to monitor computer system performance. The system includes a sample buffer to store a sample of instrumentation data, where the instrumentation data enables measurement of computer system performance. The system also includes a sample segment selector to isolate a segment of the sample of instrumentation data as an event. The system further includes an instrumentation counter counting in response to a combination of the event and a sample pulse, and asserting a sample interrupt indicating that the sample of instrumentation data is ready to logout from the sample buffer.

Another exemplary embodiment includes a method for event-based sampling to monitor computer system performance. The method includes storing a sample of instrumentation data in a sample buffer, where the instrumentation data enables measurement of computer system performance. The method also includes selecting a segment of the sample of instrumentation data as an event. The method additionally includes triggering an instrumentation counter to count in response to a combination of the event and a sample pulse, and asserting a sample interrupt indicating that the sample of instrumentation data is ready to logout from the sample buffer.

A further exemplary embodiment includes a computer program product for event-based sampling to monitor computer system performance. The computer program product includes a computer-readable storage medium storing instructions for executing event-based sampling to monitor computer system performance. The event-based sampling includes a method of: configuring a sample segment selector to isolate a segment of a sample of instrumentation data as an event. The event-based sampling also includes receiving an indicator of a sample interrupt in response to a number of events occurring in combination with a sample pulse, where the sample interrupt indicates that the sample of instrumentation data is ready to logout from a sample buffer for measurement of computer system performance. The event-based sampling additionally includes storing the sample of instrumentation data from the sample buffer to a data collector in response to receiving the indicator of the sample interrupt.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides event-based sampling to monitor computer system performance. Instrumentation allows samples of signals that are critical to performance measurement to be captured. Each sample can contain various information about processor state for performance evaluation, such as process ID, virtual storage address, op-code and information about activity associated with the instruction (delays, caching, etc.) in a computer system. Instrumentation data samples are taken periodically as defined by a sampling interval, but no logout takes place at this point to store samples to a data collector. A segment can be selected from a subset of an instrumentation sample as an event and routed to an instrumentation counter. The counter is triggered to increment/decrement in response to an event occurring in the selected sample segment concurrently with capturing an instrumentation sample to a sample buffer.

When the instrumentation counter has counted a specific number of events, an interrupt to logout the instrumentation sample is generated. Counting a specific number of events may be achieved by loading the instrumentation counter with an initial starting value and allowing the counter to increment until an overflow condition is met, decrementing the counter until an underflow condition is met, or matching a configurable reference value as detected by a compare function. Waiting for a specific number of events to occur reduces the overall volume of data that is collected. Since performance data calculations may only require a statistically significant volume of data, and not millions of samples, the samples that are logged out provide representative data for multiple occurrences of an event over a period of time.

Figure 1:
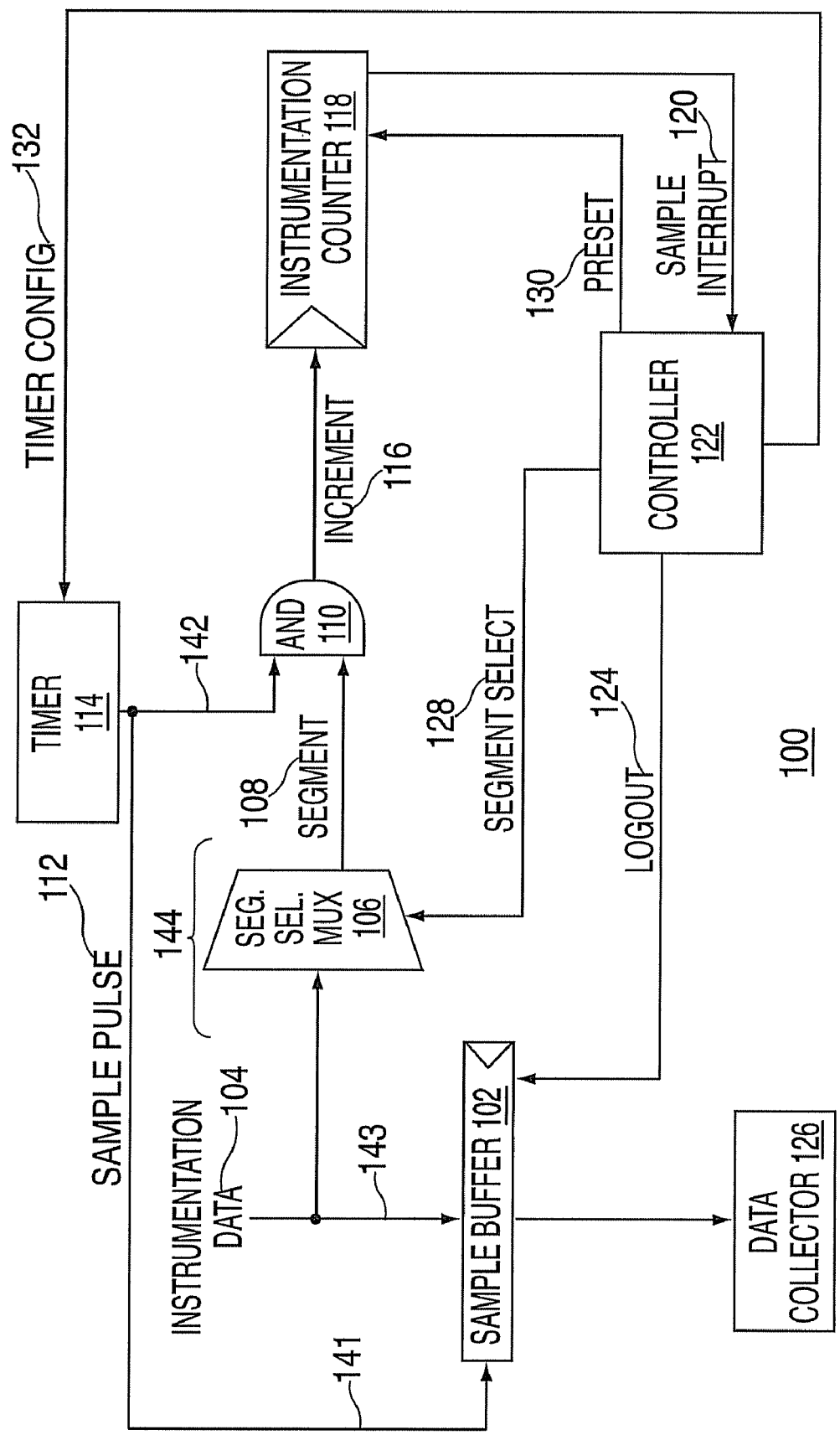
FIG. 1 depicts a block diagram of system upon which to event-based sampling to monitor computer system performance can be implemented in an exemplary embodiment.

Turning now to FIG.1, a system 100 is depicted upon which event-based sampling to monitor computer system performance is implemented in an exemplary embodiment. The system 100 may be embedded in a processor capable of executing instructions, with the system 100 capturing instrumentation data associated with executing the instructions as part of a computer system. The system 100 includes a sample buffer 102 to capture a sample of instrumentation data 104. The instrumentation data 104 is also routed to a sample segment selector multiplexer (mux) 106. In an exemplary embodiment, the sample segment selector mux 106 selects a segment 108 as a subset of the instrumentation data 104, e.g., one or more bits, and passes the segment 108 to an AND-gate 110. The AND-gate 110 also receives a sample pulse 112 generated by a timer 114. The sample pulse 112 is also routed to the sample buffer 102 to trigger storage of a sample of the instrumentation data 104. The AND-gate 110 outputs an increment signal 116 to an instrumentation counter 118, which triggers the instrumentation counter 118 to increment the current value in the instrumentation counter 118. When the instrumentation counter 118 saturates, counting to the maximum value possible based on the number of bits in the instrumentation counter 118, a subsequent increment signal 116 results in an overflow condition. In response to the overflow condition, the instrumentation counter 118 asserts sample interrupt 120, providing an interrupt indicator to a controller 122. The controller 122 can include a combination of hardware and/or firmware, such as millicode, to perform control and configuration tasks in the system 100. When the controller 122 receives and detects the indicator of the sample interrupt 120, the controller 122 outputs a logout signal 124 that triggers the sample buffer 102 to store the current sample to a data collector 126. The data collector 126 may be a memory device with the capacity to hold large volumes of data, which can be read to calculate performance metrics.

In an exemplary embodiment, the controller 122 performs other control and configuration tasks, such as configuring the sample segment selector mux 106 via segment select 128 to establish a particular segment of the instrumentation data 104 to isolate as an event. For example, bit 31 of the instrumentation data 104 may indicate a cache miss; therefore, configuring the sample segment selector mux 106 to select bit 31 increments the instrumentation counter 118 when a cache miss event aligns in time with the sample pulse 112. The controller 122 can also configure the instrumentation counter 118 via preset 130 to set a count for the number of events before the overflow condition occurs. The controller 122 may also configure the timer 114 using a timer configuration 132 to assign a sampling interval for generating the sample pulse 112. The timer configuration 132 may also support enabling and disabling of the timer 114. While described in reference to incrementing the instrumentation counter 118, the scope of the invention is not so limited. The instrumentation counter 118 can be triggered to increment or decrement. For example, counting a specific number of events may be achieved by loading the instrumentation counter 118 with an initial starting value and allowing the instrumentation counter 118 to increment until an overflow condition is met, decrementing the instrumentation counter 118 until an underflow condition is met, or matching a configurable reference value as detected by a compare function (not depicted).

Although only single instances of various elements are depicted in FIG. 1, it will be understood that multiple instances of elements are also included within the scope of the invention. For example, in one embodiment the system 100 is included in a processor chip, where multiple instances of the sample buffer 102 are spread around on the chip surface or located in some designated part of the chip, such as the processor core. In a single processor, there may be ten or more instances of the sample buffer 102, supporting a width of up to sixty-four or more bits for each. In an exemplary embodiment, multiple instances of the sample buffer 102 are spread out to place them nearby points of origination of the signals to be captured. Additionally, there may be instances of the sample segment selector mux 106, the AND-gate 110, and the instrumentation counter 118 associated with each of instance of the sample buffer 102. Furthermore, a common controller 122 or multiple instances of the controller 122, as well as the timer 114 and data collector 126 can also be employed.

It will be understood that the system 100 can include elements known in the art that are not depicted, such as latches to accommodate timing differences in a high speed design. The timer 114, the sample buffer 102, the instrumentation counter 118 and the source of instrumentation data 104 may be located at different locations in the system 100. Thus, four signal paths 141, 142, 143, and 144 could be considered for staging. Signal path 141 provides the sample pulse 112 from the output of the timer 114 to the input of the sample buffer 102. Signal path 142 provides the sample pulse 112 from the output of the timer 114 to the input of the AND-gate 110. Signal path 143 provides instrumentation data 104 from the instrumentation data source to the input of the sample buffer 102. Signal path 144 includes the segment 108 from the instrumentation data source to the input of the AND-gate 110. In order to get a sample of instrumentation data 104 correlated with an event being counted, the number of stages used on signal paths 143 and 144 may be different, but the number of staging latches used on signal paths 141 and 142 need to be adapted accordingly to take the staging offset of signal paths 143 and 144 into account.

Figure 2:
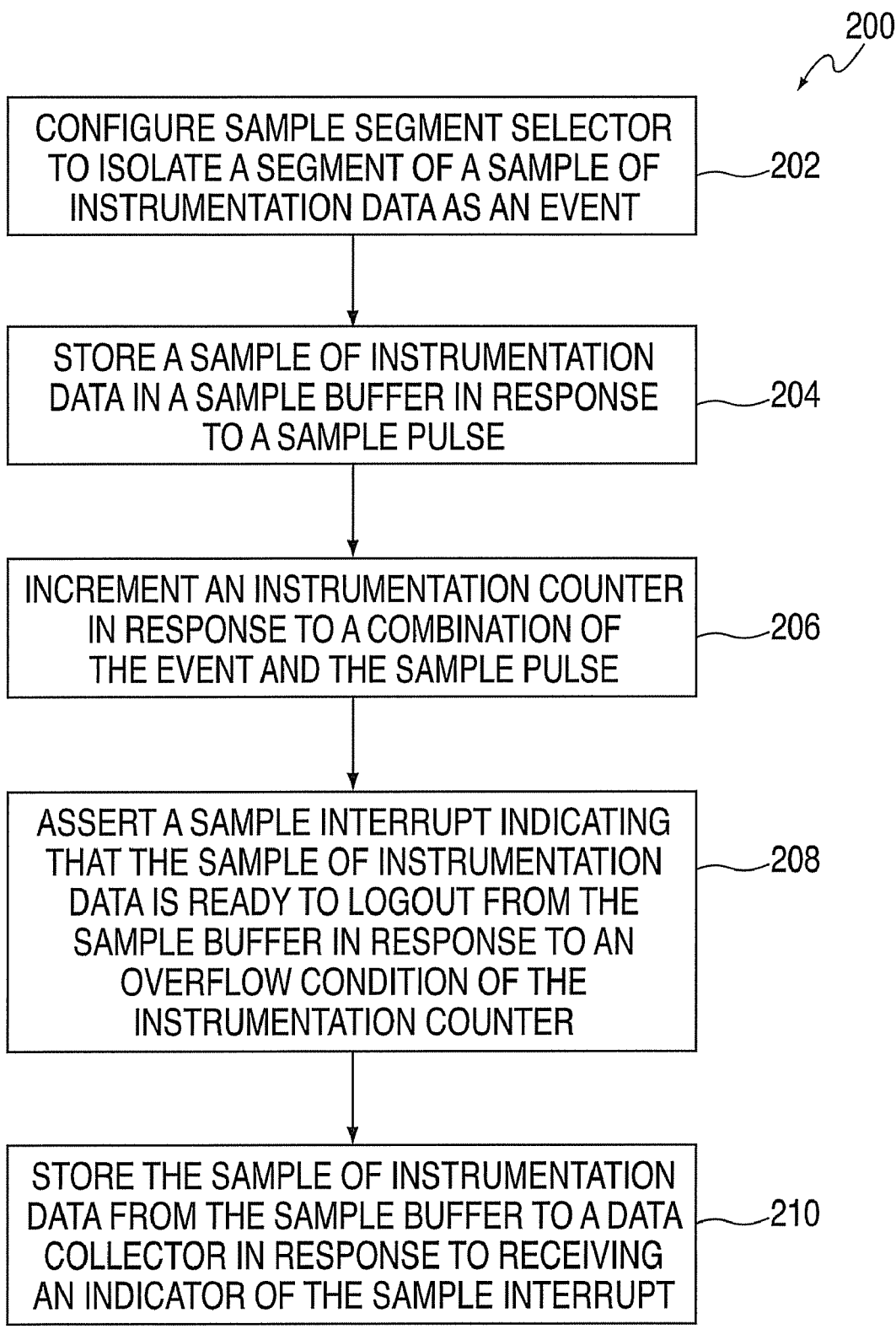
FIG. 2 depicts an exemplary process for event-based sampling to monitor computer system performance in accordance with an exemplary embodiment.

Turning now to FIG. 2, a process 200 for event-based sampling to monitor computer system performance is depicted in accordance with an exemplary embodiment and in reference to the system 100 of FIG. 1. At block 202, the controller 122 configures the sample segment selector mux 106 to isolate a segment 108 of a sample of instrumentation data 104 as an event. The controller 122 may also configure the timer 114 via timer configuration 132 to establish a sampling interval and the instrumentation counter 118 using preset 130 to count a number of events before an overflow condition occurs. For example, setting the initial count of the instrumentation counter 118 equal to the maximum value of the instrumentation counter 118 for an overflow condition minus the desired number of events, results in triggering sample interrupt 120 when the desired number of events is observed.

At block 204, the sample pulse 112 from the timer 114 triggers the sample buffer 102 to store a sample of instrumentation data 104. If the segment 108 indicates that the event occurred at the same time as the sample pulse 112, e.g., in the same clock cycle, then the AND-gate 110 outputs the increment signal 116 to increment the instrumentation counter 118 in response to the combination of the event and the sample pulse 112, as depicted in block 206. At block 208, the instrumentation counter 118 asserts sample interrupt 120, indicating that the sample of instrumentation data 104 is ready to logout from the sample buffer 102 in response to an overflow condition of the instrumentation counter 118. Any form of counting, as well as an underflow condition or matching a configurable reference value can be employed. The controller 122 receives an indicator of the sample interrupt 120 and in response thereto outputs logout signal 124 to store the sample of instrumentation data 104 from the sample buffer 102 to the data collector 126.

Technical effects and benefits include event-based sampling of instrumentation data to monitor computer system performance. The instrumentation data can be used for measuring performance of a computer system internally in a processor of the computer system with minimal additional hardware and/or firmware modification. Advantages include correlation between a sample of instrumentation data and an event. Further advantages may include a significant reduction in the number of samples of instrumentation data logged out for events that occur with a high frequency.

As described above, the embodiments of the invention may be embodied in the form of computer-implemented processes and apparatuses for practicing those processes. Embodiments of the invention may also be embodied in the form of computer program code containing instructions embodied in tangible media, such as read-only memory (ROM), electrically erasable programmable read-only memory (EEPROM), flash memory, or any other computer-readable storage medium, wherein, when the computer program code is loaded and executed in a computer, the computer becomes an apparatus for practicing the invention. The computer program code may be firmware, e.g., a portion of logic for the controller 122 of FIG. 1, embedded within an integrated circuit (IC) chip, such as a processor. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for event-based sampling to monitor computer system performance, the system comprising:
   a sample buffer to store a sample of instrumentation data, the sample of instrumentation data comprising information about a processor state and collected from the processor, wherein the sample of instrumentation data enables measurement of computer system performance;
   a sample segment selector to isolate a segment of the sample of instrumentation data, the sample of instrumentation data selected based on a configuration setting of the segment selector, the sample of instrumentation data selected as an event; and
   an instrumentation counter counting in response to a combination of the event and a sample pulse, and asserting a sample interrupt indicating that the sample of instrumentation data is ready to logout from the sample buffer.

2. The system of claim 1 wherein the sample interrupt is asserted in response to one of: an overflow condition of the instrumentation counter, an underflow condition of the instrumentation counter, and matching a configurable reference value of the instrumentation counter.

3. The system of claim 2 wherein the instrumentation counter is preset to count a number of events before the overflow condition occurs.

4. The system of claim 1 wherein the sample pulse is periodically generated by a timer, and further wherein the sample pulse triggers storage of the sample of instrumentation data to the sample buffer.

5. The system of claim 1 wherein the segment of the sample of instrumentation data includes one or more bits of the sample of instrumentation data.

6. The system of claim 1 wherein the combination is a logical AND-gate function.

7. The system of claim 1 wherein the sample buffer, the sample segment selector, and the instrumentation counter are integrated in a processor of the computer system.

8. A method for event-based sampling to monitor computer system performance, the method comprising:
   storing a sample of instrumentation data in a sample buffer, the sample of instrumentation data comprising information about a processor state and collected from the processor, wherein the sample of instrumentation data enables measurement of computer system performance;
   selecting a segment of the sample of instrumentation data, the sample of instrumentation data selected based on a configuration setting of the segment selector, the sample of instrumentation data selected as an event;
   triggering an instrumentation counter to count in response to a combination of the event and a sample pulse;
   asserting a sample interrupt indicating that the sample of instrumentation data is ready to logout from the sample buffer; and
   storing the sample of instrumentation data in a data collector.

9. The method of claim 8 wherein the sample interrupt is asserted in response to one of: an overflow condition of the instrumentation counter, an underflow condition of the instrumentation counter, and matching a configurable reference value of the instrumentation counter.

10. The method of claim 9 further comprising:
    presetting the instrumentation counter to count a number of events before the overflow condition occurs.

11. The method of claim 8 wherein the sample pulse is periodically generated by a timer, and further wherein the sample pulse triggers storage of the sample of instrumentation data to the sample buffer.

12. The method of claim 8 wherein the segment of the sample of instrumentation data includes one or more bits of the sample of instrumentation data.

13. The method of claim 8 wherein the combination is a logical AND-gate function.

14. The method of claim 8 wherein the method is performed in a processor of the computer system.

15. A computer program product for event-based sampling to monitor computer system performance, the computer program product comprising:

a non-transitory computer-readable storage medium storing instructions for executing event-based sampling to monitor computer system performance, the event-based sampling comprising a method of:

configuring a sample segment selector to isolate a segment of a sample of instrumentation data, the sample of instrumentation data selected based on a configuration setting of the segment selector, the sample of instrumentation data isolated as an event;

receiving an indicator of a sample interrupt in response to a number of events occurring in combination with a sample pulse, wherein the sample interrupt indicates that the sample of instrumentation data is ready to logout from a sample buffer for measurement of the computer system performance; and storing the sample of instrumentation data from the sample buffer to a data collector in response to receiving the indicator of the sample interrupt, the sample of instrumentation data comprising information about a processor state and collected from the processor.

16. The computer program product of claim 15 wherein the sample interrupt is asserted in response to a condition of an instrumentation counter that counts in response to the events occurring in combination with the sample pulse.

17. The computer program product of claim 16 further comprising:

presetting the instrumentation counter to count a number of events before the condition occurs.

18. The computer program product of claim 15 wherein the sample pulse is periodically generated by a timer, and further wherein the sample pulse triggers storage of the sample of instrumentation data to the sample buffer.

19. The computer program product of claim 15 wherein the segment of the sample of instrumentation data includes one or more bits of the sample of instrumentation data.

20. The computer program product of claim 15 wherein the instructions are firmware in a processor of the computer system.

* * * * *